UNITED STATES PATENT OFFICE.

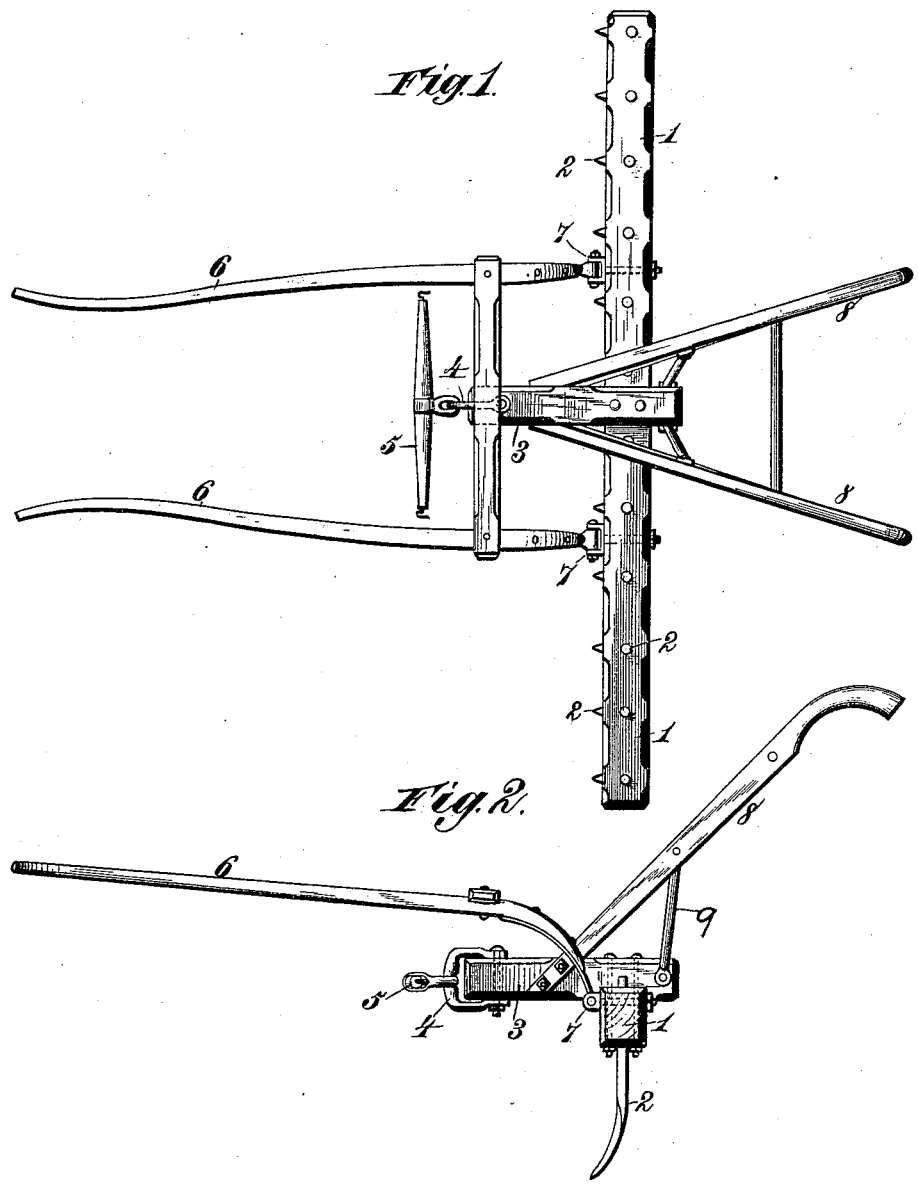

CHRISTOPHER E. G. FELL, OF SAVANNAH, GEORGIA.

HORSE-RAKE.

SPECIFICATION forming part of Letters Patent No. 404,269, dated May 28, 1889.

Application filed January 24, 1889. Serial No. 297,345. (No model.)

*To all whom it may concern:*

Be it known that I, CHRISTOPHER E. G. FELL, a citizen of the United States, residing at Savannah, in the county of Chatham and State of Georgia, have invented new and useful Improvements in Horse-Rakes, of which the following is a specification.

In that type of farm implements worked by teams wherein draft thills or poles are employed to guide a rake-head carrying a series of teeth for raking grass or stubble the draft of the animal is ordinarily transmitted to the rake-head through the thills by a whiffletree thereupon, and where the rake-head is without supporting ground-wheels, but rests by the points of the teeth upon the earth and is guided by rear handles, the draft-strain or pull on the arched or bent and hinged thills causes the rake-head to tilt forward, thereby rendering the implement exceedingly difficult and awkward to handle and control in the field. In those implements where a single row or line of spring-teeth are employed for raking the thills or a pole or tongue are important for the purpose of supporting the rake-head in its elevated position, that the teeth may stand vertically, and for the further purpose of enabling the draft-animal to control and direct the course of the rake-head.

My invention therefore has for its objects to improve this species of farm implements, to provide a simple, economical, and efficient rake, and to provide a rake-head having spring-teeth, with a rigid draft-beam located beneath the horizontal portions of the thills in such manner that the thills, when the draft-animal is harnessed thereto, simply serve as a medium whereby the rake-head is supported in its elevated position, and the draft-animal can accurately guide and control the implement in the various lines of movement required in the field, while the draft-strain is transmitted to the rake-head independent of and without strain on the thills, the relative position of the parts being such that the rigid draft-beam and hinged thills coact to sustain the rake-head in its elevated position without tipping forward, that the vibratory spring-teeth may stand perpendicular, or substantially so, at all times, while rear handles permit the entire structure to be balanced and placed under complete control of the attendant to facilitate working in the field.

The objects of my invention I accomplish by the novel features of construction and combination and arrangement of devices hereinafter described, and specifically set forth in the claims, reference being made to the accompanying drawings, in which—

Figure 1 is a top plan view of a rake constructed in accordance with my invention, and Fig. 2 an end elevation of the same.

In order to enable those skilled in the art to make and use my invention, I will now describe the same in detail, referring to the drawings, where the numeral 1 indicates the horizontal rake-head having a row or line of vibratory spring-teeth, 2, fixed at their upper ends in any manner suitable for the conditions required and free to shake or vibrate from the under side of the rake-head to their points, to prevent clogging by the accumulation of grass. These teeth in practice are made of any suitable metal, of considerable length, and they are designed to rake or gather grass or stubble, hay, grain, and for similar purposes.

The rake-head is provided centrally between its extremities with a rigid draft-beam, 3, having its rear end portion bolted in a stationary position upon the upper side of the rake-head, and its forward end is provided with a clevis, 4, to which is adjustably secured a whiffletree, 5, for the attachment of the harness-traces in such manner that the leverage of the draft-strain is upward and directly transmitted to the rake-head independent of and without strain or pressure on the thills 6, which are hinged at 7 to the rake-head at opposite sides of the rigid draft-beam.

The draft-animal is harnessed to the thills, so that the latter are confined within definite limits as regards rising and falling movements, as is usual; but, the harness-traces being secured to the whiffletree on the draft-beam, strain is transmitted to the rake-head entirely independent of and without strain or draft on the thills. The rigid draft-beam projects in advance of the rake-head beneath the horizontal parts of the thills, and the direct draft attachment is between such horizontal parts and the hinges of the arched or bent ends of the thills, so that the draft-beam and thills coact to sustain the rake-head in its elevated position without unduly tipping forward, that the spring-teeth may stand perpendicular, or substantially so.

The controlling-handles 8 are secured in a fixed position to the rigid draft-beam in advance of the toothed bar at a point about midway between the latter and the clevis or forward end of the draft-beam, and such handles are braced by brace-rods 9, connected at their lower ends to the draft-beam and at their upper ends to the handles. This arrangement and attachment of the handles in the construction set forth is important, in that it balances and places the implement under perfect control of the attendant for correct management in the field, while the direct course of advancing and turning movements is by the thills placed under control of the draft-animal directed by the attendant.

The application of the draft-strain to the rake-head through the rigid draft-beam independent of the thills causes the spring-teeth to more readily take hold and the implement to work more easily and be more readily controlled. If desired, a tongue or pole may be substituted for the thill and a doubletree for the whiffletree, such tongue or pole having the usual construction that will permit it to be hinged at the points 7; but the implement otherwise remains as shown and described.

The thills serve to sustain the rake-head in its elevated position against undue forward or backward tipping and enable the animal or team, under the direction of the attendant, to correctly guide the implement in right lines, or when making turns, and otherwise place the structure under control of the draft-animal or team and the attendant or driver for manipulations in the field that may be necessary or desirable, while the arrangement of the draft attachment under the horizontal parts of the thills or pole tends to draw the draft-beam upward and tilt the rake-head backward, which is counteracted by the pressure of the soil on the points of the teeth, so that the implement works with facility and is readily governed and controlled.

For the purposes of my invention and to provide an efficient implement it is important that the rake-head be located directly over and in the plane of the perpendicular portions of the teeth, so that the teeth resting on the ground correctly sustain the rake-head. The thills are hinged for the purpose of avoiding the rocking motion that would be imparted to the rake-head by the movements of the draft-animal were the thills fixed to the rake-head.

Having thus described my invention, what I claim, and desire to secure by Letters Patent, is—

1. The combination of the rake-head carrying a line of spring-teeth, the thills secured to the rake-head for guiding and directing the latter, a rigid draft-beam attached to and projecting in advance of the rake-head beneath the horizontal part of the thills for transmitting the draft-strain to the rake-head independent of the thills, and controlling-handles, substantially as described.

2. The combination of the rake-head carrying a line of spring rake-teeth, the thills hinged to the rake-head for guiding and directing the latter, a rigid draft-beam attached to and projecting in advance of the rake-head centrally between the hinges of the thills and below the horizontal parts of the latter and having a whiffletree at its front end for transmitting the draft-strain to the rake-head independent of the thills, and controlling-handles secured to the draft-beam between its forward end and the rake-head, substantially as described.

In testimony whereof I affix my signature in presence of two witnesses.

CHRISTOPHER E. G. FELL.

Witnesses:
A. H. MACDONELL,
JOHN S. SCHLEY.